Jan. 11, 1966   N. S. WOOLF   3,228,243
FLUID FLOW METER
Filed Nov. 7, 1961   5 Sheets-Sheet 1

INVENTOR
Norman S. Woolf
BY *Krauch, Nolan & Neale*
ATTORNEYS

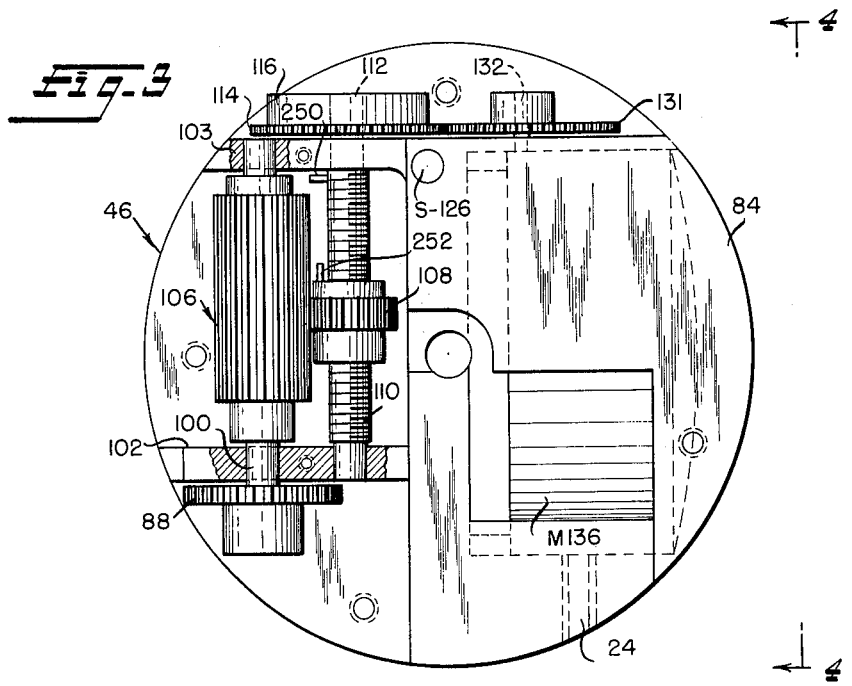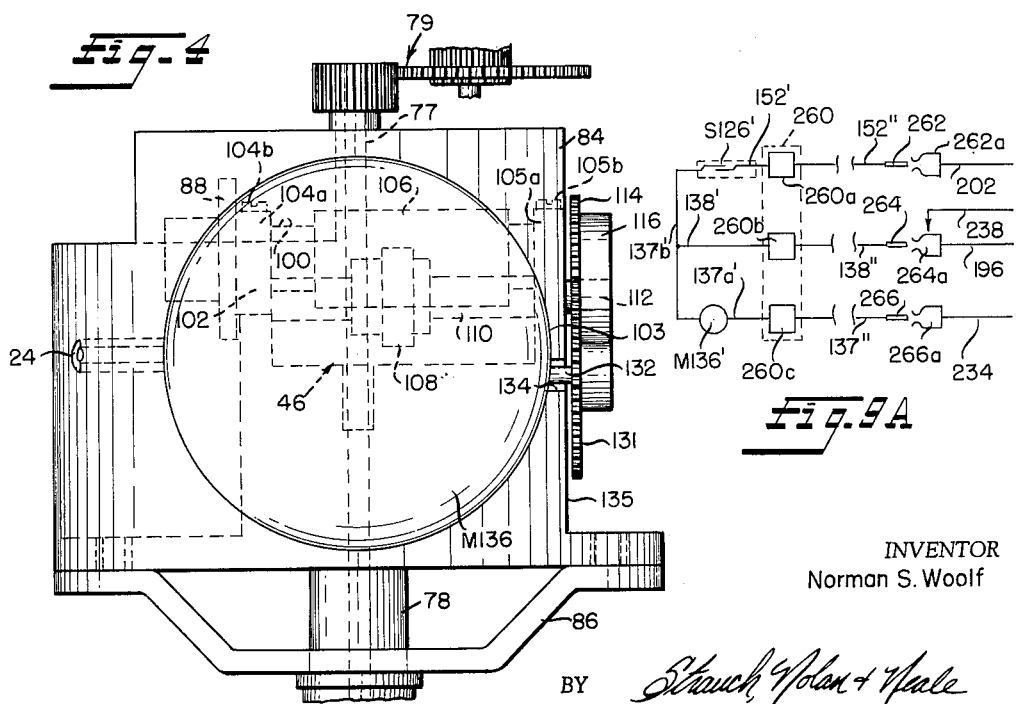

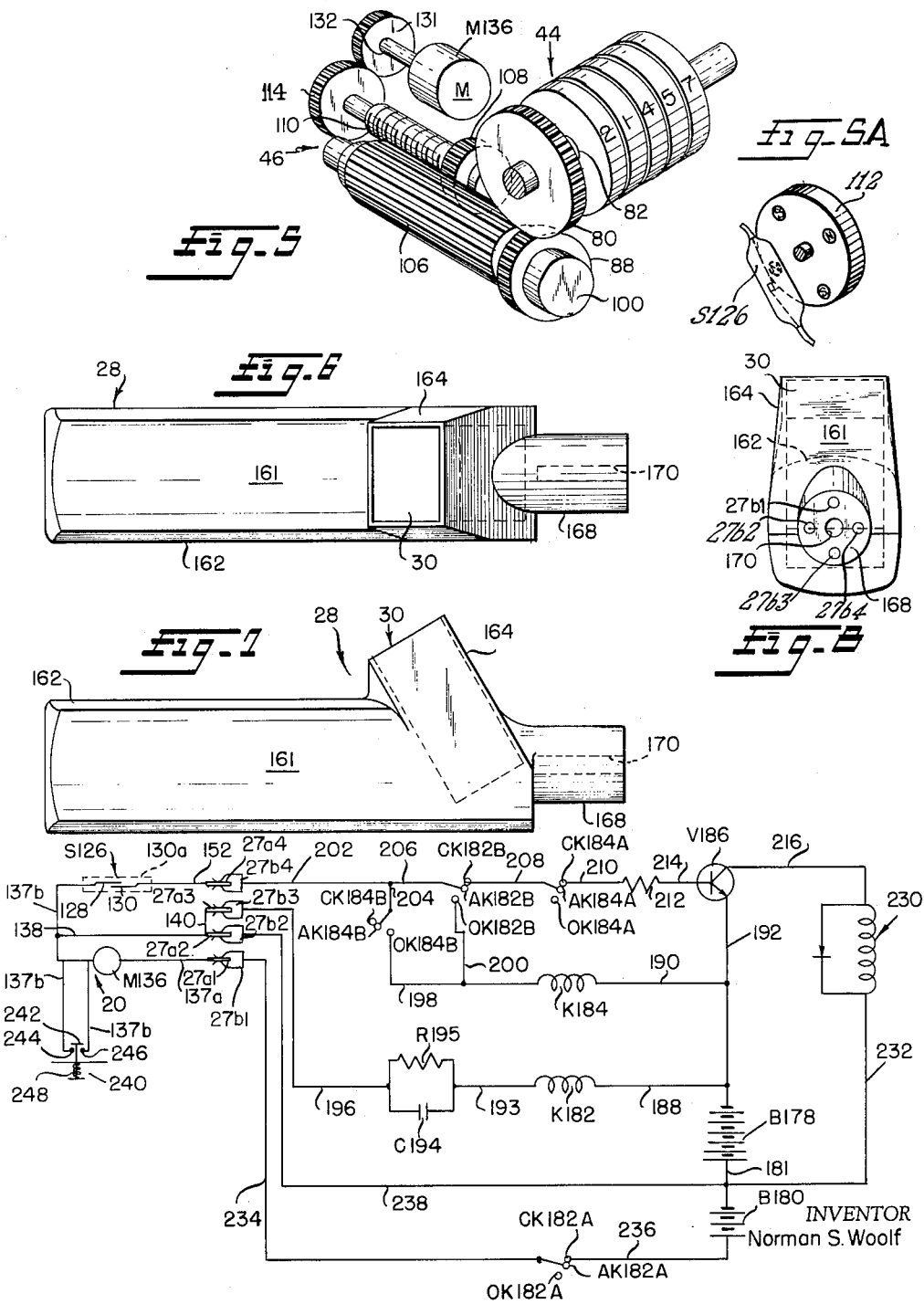

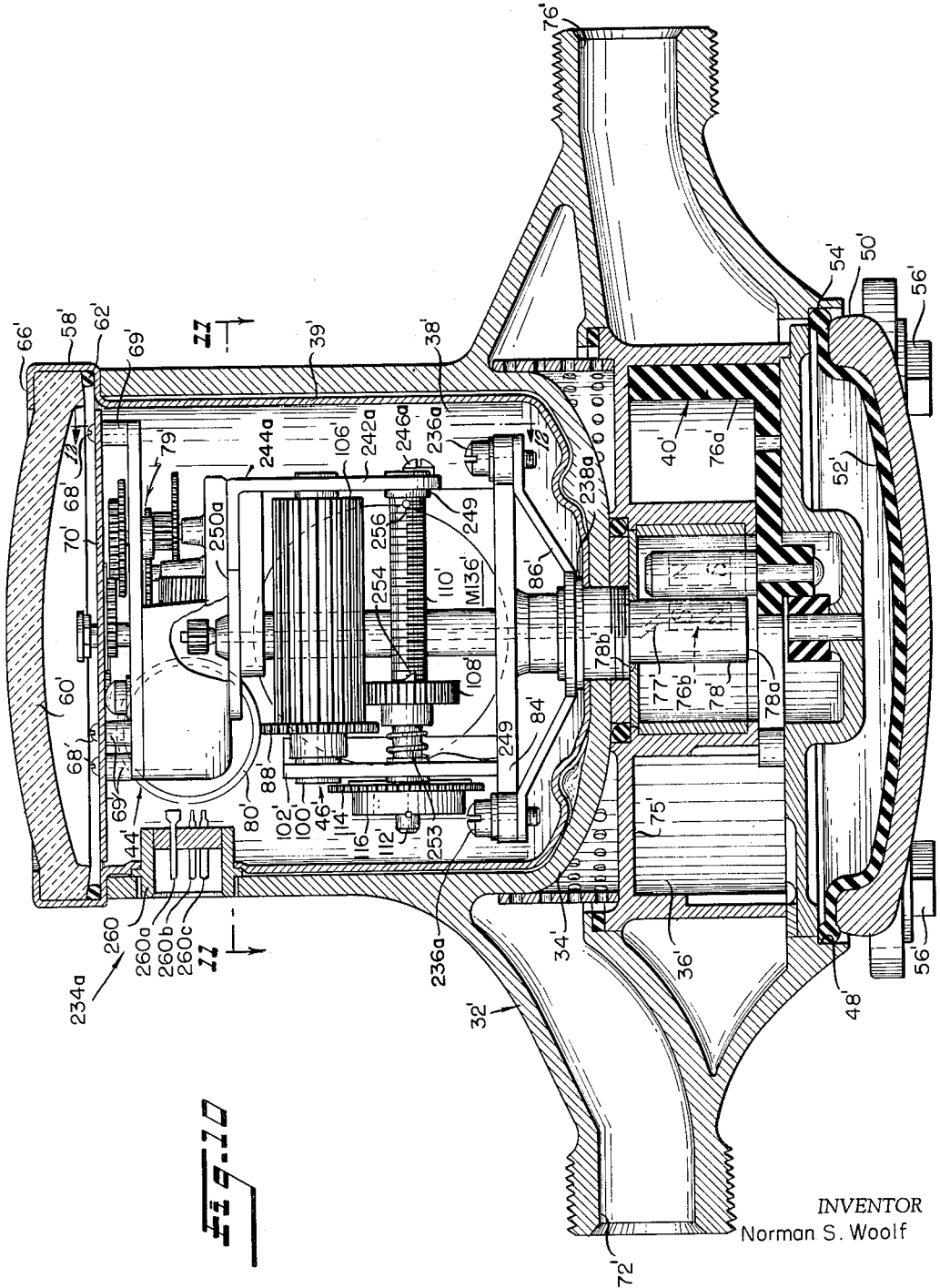

Jan. 11, 1966        N. S. WOOLF        3,228,243

FLUID FLOW METER

Filed Nov. 7, 1961        5 Sheets-Sheet 5

INVENTOR
Norman S. Woolf

BY *Strauch, Nolan & Neale*
ATTORNEYS

United States Patent Office 3,228,243
Patented Jan. 11, 1966

3,228,243
FLUID FLOW METER
Norman S. Woolf, Pittsburgh, Pa., assignor to Rockwell
Manufacturing Company, Pittsburgh, Pa., a corporation of Pennsylvania
Filed Nov. 7, 1961, Ser. No. 150,689
30 Claims. (Cl. 73—198)

This invention relates to meters for measuring and registering the volume of fluid flow through a conduit. More particularly, it relates to a fluid flow meter equipped with an analog device for storing information relating to the volume of liquid passed through the meter and a portable, remotely readable interrogating and registering device for extracting and recording the information stored by the analog device. The principles of this invention are particularly applicable to water consumption meters although it is to be understood that the invention is by no means limited to this one particular application.

The conventional water consumption meter is equipped with a fluid flow measuring mechanism and a register which indicates the cumulative total of the volume of water passed through the meter. The meter is read periodically and the next preceding reading is subtracted from the current reading, the difference between the readings being the volume of water passed through the meter in the period between the current and precedent reading. The customer is then billed on the basis of this computed volume.

In the northern areas of this country, water consumption meters are frequently located in heated structures to prevent them from freezing during the winter months when sub-freezing temperatures normally prevail. This means that if the structure is a home (and this is where the majority of water consumption meters are employed), the meter reader must obtain access to the home to read the meter. Frequently no one is at home when the meter reader calls and he is forced to estimate the meter reading or to return another time. Neither of these solutions is satisfactory. If the meter reader estimates the reading, the home owner may object should he discover that the consumption volume indicated on his bill does not correspond to the volume indicated by his meter. And if the meter reader is forced to make a return trip, the time required to make the first trip is wasted and his employer is saddled with an additional expense which he must pass along to the consumer.

To eliminate the access problem, it was first proposed to make the meter register visible from the exterior of the house by employing periscopes, light conductors, or closed television circuits. These proposals were abandoned because of the practical difficulties involved.

It was then suggested that a remote register be provided on the exterior of the house. It became apparent that the major obstacle to providing a remote register was the lack of a suitable power source to operate it. External, permanently installed power sources such as taps from the house's electrical circuits or from the external power lines, solar batteries, and power turbines in the water line leading to the house were rejected as impracticable.

Subsequently, a meter equipped with a remote register was developed which employed the force exerted by the water passing through the meter to operate the remote register. As water flowed through the meter, it caused a spindle to rotate and the spindle, acting through a gear train, wound a torque spring similar to the main spring of a clock. The gear train was so constructed that, when one of its gears had rotated through a preselected angle, it would release the wound torque spring which would, of course, immediately unwind. As the torque spring unwound, it rotated a magnet over a group of pole-containing coils. This generated a series of electrical pulses which were transmitted by wire to a remotely located, electrical-pulse-actuated register which was thereby activated to record the volume of fluid passed through the meter.

There are several objections to this type of meter. First, it is inaccurate. Water passing through the meter while the torque spring is unwinding is not measured since the gear train is disconnected from the torque spring during this period. Second, the meter becomes more inaccurate with continued use since the continual winding and unwinding of the torque spring changes its elastic properties. And, finally, the increased strain placed on the moving parts in the meter by the resisting force of the torque spring decreases the useful life of the meter.

Another disadvantage of the prior art resettable remote registers derives from their indicator, which conventionally consists of a flat dial face having equidistantly spaced, serially numbered indices around its periphery and a pointer, pivotally mounted at its center, which is moved across the face as fluid flows through the meter. In a typical water meter, the distance between adjacent indices represents one billing unit and one unit may be a large quantity of water, for example 1000 gallons. When a remote register of this type is read, the pointer may lie between adjacent indices. The meter reader must then record the lower number, which penalizes the utility, or the higher number, which penalizes the consumer. Since this fractional part of a billing unit, which may represent a substantial quantity of water, is irretrievably lost when the meter reader resets the register to "zero" after reading it, there is no way to later compensate for this error.

This invention provides a water consumption meter equipped with a remote register which has none of the objectionable features of the prior art meters. Briefly, it consists of a conventional water consumption meter equipped with an analog type, information storing device and a battery-operated, hand-carried, interrogating device for extracting and recording the information from the analog storage device.

The analog storing device, which is extremely simple and accurate, consists of a follower journalled on a threaded shaft and connected by a gear train to the input shaft of the meter register. As the register input shaft is rotated by a metering device actuated by water passing through the meter, it causes the follower to be moved axially along the threaded shaft, the total travel, therefore, being indicative of the volume of water passed through the meter.

The interrogating and registering mechanism consists of two simple sub-systems, one of which is located within the meter and the other of which is incorporated in the hand-carried, battery-powered tool. The meter sub-system comprises a magnetized disc attached to one end of the threaded shaft and provided with alternating north and south pole segments, a motor which is selectively operable to rotate the disc, and a reed switch adapted to be alternately opened and closed by the poles on the disc as they are rotated in close proximity to it. The hand-carried tool comprises a battery, an electrical-pulse-actuated register, and the necessary associated circuitry to activate the motor and the register.

The reed switch and the motor are electrically connected to a receptacle located on the exterior of the building in which the meter is housed. When the hand-carried tool is plugged into the receptacle, a circuit to the motor is completed and the motor rotates the threaded shaft, causing the follower to move axially along the shaft to its original position (it being remembered that the follower has previously been moved along the shaft by the action of the metering device). The magnetized disc rotates with the shaft and alternately opens and closes the reed switch (which is, by insertion of the hand tool, coupled into a circuit disposed in the hand tool and including the battery and the remote register), thereby providing pulses of electrical current to operate the register.

The advantages of the present invention are manifold. The problem of access to the building in which the meter is located is eliminated. Since the analog storage device is returned to the zero position each time the stored information is extracted from it, the volume of water consumed during the billing period is indicated directly on the remote register and the computation required with the cumulative total type register is eliminated. The meter does not require a permanently installed, external power source but is operated by inexpensive dry cells.

The meter is extremely accurate and the accuracy does not decrease as the meter is used since all springs (and similar components wherein the physical properties which must remain constant to produce accurate measurements vary with continued use) are eliminated. Moreover, a single remote register and power source may be used to read any number of meters.

A further feature of the meter provided by the present invention is the novel registering and information storing sub-assembly. This sub-assembly comprises a hermetically and permanently sealed casing within which are mounted the analog-type information storage mechanism, the meter sub-system of the interrogating and registering mechanism, and a conventional totalizing register. The sealed casing prevents dirt and moisture from penetrating to the interior of the casing and prevents unauthorized persons from tampering with the mechanism in the casing. This is extremely important in this meter construction because the totalizing register and the actual meter are viewed by the meter reader only at very infrequent intervals, such as once a year.

An additional feature of the meter provided by the present invention is that, unlike the prior art meters, fractional billing units are not lost when the remote meter register is read and reset, but are carried over to the next period and are added to the total of the units metered during that period. Thus, over several billing periods, the meter will very accurately reflect the actual volume of fluid passed through the meter.

The objects of this invention include:

(1) The provision of an improved remotely readable fluid flow meter;

(2) The provision of a fluid flow meter having an analog device for storing information relating to the volume of fluid passed through the meter and a hand-carried interrogating device for retrieving and recording said information;

(3) The provision of a self-contained, hand-carried tool for directly reading, at a location remote from a fluid flow meter, the volume of fluid passed through the meter in a preselected period;

(4) The provision of a self-contained, battery-powered, hand tool which may be used to remotely read any number of fluid flow meters;

(5) The provision of a counter having a device for storing a count in analog form and a readout device for extracting the count from the storage device, converting it to digital form, and registering it;

(6) The provision of a counter having a device for storing a count in analog form, a pulse generator for extracting the count from the storage device and converting it to a series of pulses, and a pulse suppressing circuit for preventing more than one pulse from being generated for any one unit of the count extracted from the analog storage device;

(7) The provision of a remotely readable self-compensating, fluid meter mechanism which, over a number of billing periods, will accurately reflect the actual volume of fluid passed through the meter in the period; and (8) The provision of a fluid flow meter sub-assembly having a totalizing register, an analog-type information storage device and an information readout sub-system permanently and hermetically sealed within a casing which must be destroyed to gain access to its contents and thereby prevents moisture and dirt from penetrating to the interior of the casing and, in addition, prevents unauthorized persons from tampering with the mechanism sealed therein.

These and other objects of the invention will become more fully apparent by reference to the appended claims and as the following detailed description proceeds with reference to the accompanying drawings in which:

FIGURE 3 is a plan view of the meter taken substantially along line 3—3 of FIGURE 2 with the cumulative register of the meter removed and showing the novel analog type information storing device of the instant invention;

FIGURE 4 is an elevational view of the meter taken substantially along line 4—4 of FIGURE 3;

FIGURE 5 is a perspective view of the information storing device;

FIGURE 5A is a fragmentary perspective view of the present invention, illustrating the cooperation of a rotatable magnetized disc and a reed switch actuated by the disc.

FIGURE 6 is a top plan view of the remote meter reader illustrated in FIGURE 1;

FIGURE 7 is a side view of the remote meter reader;

FIGURE 8 is a right hand end view of the remote meter reader;

FIGURE 9 is a wiring diagram showing the electrical circuits in the meter and in the remote meter reader;

FIGURE 9A is a wiring diagram showing the electric circuit modifications necessitated by the second embodiment of this invention as shown in FIGURES 10–12;

FIGURE 10 is an elevational view, partly in section, of an alternate embodiment of a fluid flow meter constructed in accordance with the principles of the present invention;

Figure 1:
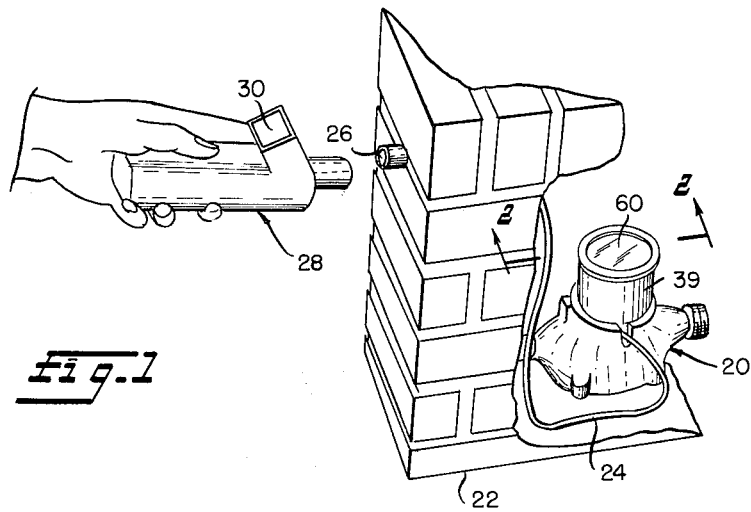
FIGURE 1 is an illustration of one particular application of a fluid flow meter and a remote meter reader constructed in accordance with the principles of the present invention.
Figure 2:
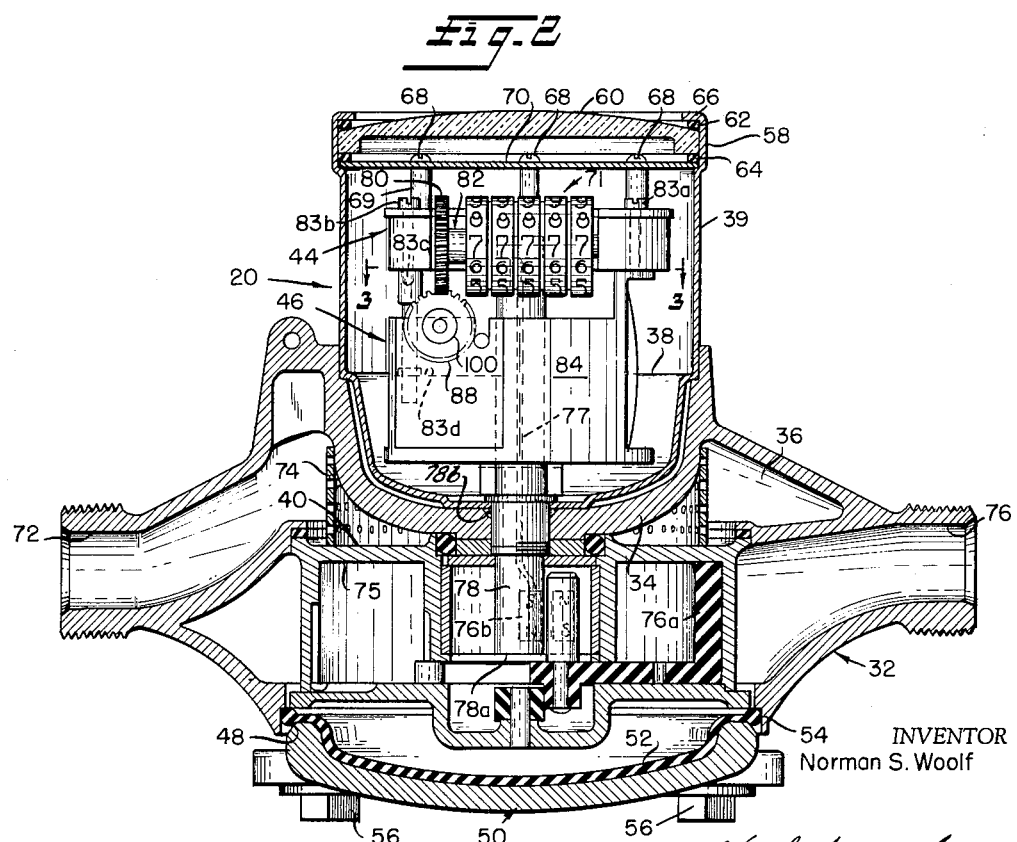
FIGURE 2 is a sectional view of the meter illustrated in FIGURE 1 and is taken substantially along line 2—2 of FIGURE 1.

Referring now to the drawings, FIGURE 1 illustrates a typical application of the novel fluid flow meter and the novel remote meter reader provided by the present invention. The flow meter is, in this application, a water consumption meter 20 located in the interior of a building 22 and connected by a multiple-wire electrical conductor 24 to a receptacle 26 mounted on the exterior of the building into which a meter reader 28 is adapted to be inserted. In this application, receptacle 26 is of conventional construction and has four pins 27a connected to the wires or leads in conductor 24 (see FIGURE 9). The remote meter reader 28 has four pin receiving contacts 27b1, 27b2, 27b3 and 27b4 which receive the male contact pins 27a1, 27a2, 27a3 and 27a4 in receptacle 26 when the meter reader is plugged into the receptacle. This completes a novel circuit provided by the present invention and causes a register 30 incorporated into meter reader 28 to indicate directly the total volume of water passed through meter 20 since the next preceding reading. Thereupon meter reader 28 may be disconnected from receptacle 26 and, after recording of its reading and resetting it to zero, used to read another meter.

Meter 20 is of the same general construction as the meter described in detail in United States Patent No. 2,857,763 issued to R. Z. Hauge et al., October 28, 1958, for "Fluid Meters." It consists of a casing 32 divided by an integral wall portion 34 into a lower chamber 36 and an upper chamber 38. Lower chamber 36 housing an oscillating piston type, fluid flow measuring device 40 and upper chamber 38 houses a sub-assembly comprising a permanently and hermetically sealed casing 39 within which are mounted a cumulative type register 44 and a resettable, analog type, information storing device 46. The register 44 is operated by the flow measuring device 40 and registers the cumulative volume of the fluid passed through meter 20. Simultaneously, measuring device 40 furnishes information relating to the volume of fluid passed through meter 20 to the storage device 46 which stores this information in analog form.

The bottom access opening 48 of casing 32 is closed by a frangible frost plate 50 having a corrosion resistant liner 52 and maintained in fluid tight relationship to meter casing 32 by an annular bead 54 integral with liner 52 and a plurality of suitably spaced bolts 56.

The permanently and hermetically sealed casing 39 is fabricated from non-corrodible material such as stainless steel and has, at its upper end, a radially enlarged portion 58 which receives a transparent window 60. Window 60 is held in sealed relation to enlarged casing portion 58 between gaskets 62 and 64. The top peripheral edge 66 of casing 39 is spun over gasket 62 to form a permanent seal which dirt and moisture cannot penetrate and which cannot be disassembled without destruction of the casing. Thus, unauthorized persons are prevented from tampering with the register 44 or information-storing device 46.

Secured to the top of register 44 by screws 68 and spacers 69 is a dial plate 70 through which a portion of the plural order counter mechanism 71 of register 44 is visible. This arrangement enables the meter reader to read the meter through the transparent window 60.

Water enters meter 20 through an inlet port 72 in casing 32, flows through a cylindrical screen 74 into lower chamber 36, enters measuring device 40 through an inlet port in the top wall 75 thereof (not shown) and is exhausted therefrom through a radial outlet port (not shown) to an outlet port 76 in meter casing 32. Flow measuring device 40 is constructed in accordance with the principles set forth in the patent to R. Z. Hague et al., referred to above, which may be referred to if further details are needed for a complete understanding of the present invention. In brief, oscillation of the piston 76a in measuring device 40 through the intermediary of magnetic drive coupling 76b causes rotation of a spindle 77 (see FIGURE 4) mounted in a coaxial tubular member 78 in the manner described in detail in said Hague et al. patent. Tubular member 78, which is closed at its bottom end by an integral wall 78a, is secured in sealing relationship to casing 39 by an annular weld 78b or by brazing and is threaded into the meter body to establish a firm connection between it and the body. The spindle 77 is connected through gear reduction drive 79 (a portion of which is shown in FIGURE 4 and which may be of the type illustrated in the forementioned patent to R. Z. Hague et al.) to a worm wheel 80 mounted on the input shaft 82 of the plural order, intermediate pinion type, carry-over mechanism equipped counter 71 of register mechanism 44. Register mechanism 44 is also of conventional construction and is preferably of the type described in the patent to R. Z. Hague et al., referred to above. Register 44 is fastened to the top of the information storing device by screws 83a (only one of which is illustrated) and by a screw 83b which is threaded into a support 83c. The lower end of support 83c is threaded into a horizontal wall surface 83d of support casting 84.

Worm wheel 80 also drives the input gear of analog information storage device 46, which constitutes an important part of this invention (and which is shown in FIGURES 2-5). Storage device 46 is mounted in the support casting 84 which is attached by screws (not shown) to a bracket 86. Bracket 86 is fixed to tubular member 78 within the confines of casing 39. The input gear of information storage device 46 is a helical gear 88 rotatively fixed to an input shaft 100 which is journalled in appropriate bearings (not shown) in oppositely disposed, vertical side wall portions 102 and 103 of support 84. Pillow blocks 104a, secured to wall portion 102 by screws 104b and 105a, and to wall portion 103 by screws 105b, secure shaft 100 in place. As is best shown in FIGURE 3, input gear 88 is located adjacent the outer side of wall portion 102. Input gear 88 is engaged and driven by the worm wheel 80 (which, it will be remembered, is driven by measuring device 40 through spindle 77 and gear reduction drive 79 and is also the input to register counter mechanism 71).

Rotatively fixed to and mounted on input shaft 100 between wall portions 102 and 103 is a cylindrical spur gear 106. Spur gear 106 engages, and drives, a spur gear 108 which has a threaded axial bore (not shown). Spur gear 108 is mounted on and travels along a threaded shaft 110. Threaded shaft 110 is rotatably journalled in, and mounted in axially fixed position between, vertical wall portions 102 and 103 of support casting 84 with one end 112 extending outwardly beyond wall 103.

Fixed to the outer end 112 of shaft 110 for rotation therewith is a unitary assembly consisting of a spur gear 114 and a flat-surfaced magnetized disc 116 rotatively fixed thereto and provided with a plurality of alternating north and south poles (see FIGURE 5A). Disc 116 may be of any of a number of suitable constructions including those disclosed in United States Patent No. 2,855,585 issued October 7, 1958, to E. J. Quinby for Dial Reading Device. Mounted adjacent magnetic disc 116 is a reed switch S126 (see FIGURES 3 and 9). Reed switch S126 has a pair of contacts 128 and 130 which are fabricated of magnetizable material and are closed by the magnetic fields of either polarity generated by the alternating north and south poles on rotating disc 116 to generate a series of pulses to operate the register 30 in hand tool 28. Contacts 128 and 130 are sealed in a glass envelope 130a in the conventional manner as shown in United States Patent No. 2,289,830 issued July 14, 1942 to W. B. Ellwood for "Circuit Closing Device." It will be understood that switch S126 is closed by being subjected to the influence of a magnetic field at either polarity and is opened only when the field is removed. Thus the switch will be closed and opened once each time a field of either polarity passes in close proximity to it.

Spur gear 114 is continuously engaged by a spur gear 131 and is driven by spur gear 131 only at the selected intervals when it is desired to extract the information stored in storage device 46. Spur gear 131 is rotatively fixed to a shaft 132 extending through a horizontally extending slot 134 in a vertical wall 135 of casting 84.

As is shown in the schematic illustration in FIGURE 5, shaft 132 is rotated by a miniaturized electric motor M136. In the embodiment shown in FIGURES 2-4, shaft 132 is the output of a conventional gear train (not shown) driven by motor M136. Motor M136 is rigidly mounted in support casting 84 in any convenient manner.

Turning now to FIGURE 9, motor M136 is provided with a pair of leads 137a and 137b, the latter being connected to reed switch contact 128. Also connected to lead 137b (between motor M136 and reed switch contact 128) is lead 138 which terminates in pin 27a2 in receptacle 26. Lead 137a extends directly from motor M136 to one of the receptacle pins 27a1. Switch contact 130 is similarly connected directly by a lead 152 to a receptacle pin 27a4. Pins 27a3 and 27a4 are connected together in the receptacle by jumper 140. The three leads 137a, 138, and 152 together constitute conductor 24 which extends from the meter to the remotely located receptacle 26 and are effective to convey motor operating current from the portable tool 28 to motor M136 and register-operating pulses from reed switch S126 to register 30.

The operation of the fluid flow meter is as follows: water entering fluid flow meter 20 through inlet port 72 flows through screen 74 into the measuring device 40, causing oscillation of piston 76a. The water then passes through an outlet port (not illustrated) in measuring device 40 back into the meter casing and is discharged through outlet port 76. Oscillation of piston 76a causes rotation of spindle 77 which, acting through gear reduction drive 79, drives worm wheel 80. Worm wheel 80, it will be remembered, is connected to the input shaft 82 of cumulative register counter 71. Thus, register counter 71 will be operated to indicate a cumulative total of the volume of liquid passed through fluid flow meter 20. Worm wheel 80, at the same time, drives the input gear 88 of the analog information storage device 46. Gear 88 drives shaft 100, to which it is fixed, rotating cylindrical gear 106. As gear 106 rotates, it drives spur gear 108 which, therefore, moves axially along threaded shaft 110. The distance which spur gear 108 moves along threaded shaft 110 is directly proportional to the volume of fluid passed through flow meter 20. When the end of a billing period is reached, the hand-carried tool 28 may be plugged into receptacle 26 to activate motor M136 to move spur gear 108 back to its zero position, thereby rotating disc 116 and generating a series of pulses which are transmitted to register 30 to cause it to indicate the volume of fluid passed through meter 20 during the billing period.

As is shown in FIGURES 6–9, the portable hand-carried remote meter reader 28 constitutes a casing 161 having a hollow hand grip 162 within which are mounted the electrical components shown in FIGURE 9. An upwardly extending portion 164 of casing 161 houses the conventional electrical-pulse-actuated register 30. A forwardly extending portion 168 of casing 161 mounts the four female contacts 27b1–27b4 and is dimensioned to fit within receptacle 26 with the pins 27a1–27a4 in the receptacle inserted into the female connectors. The forwardly extending casing portion 168 is also provided with an axial bore 170 which is adapted to receive a guide pin (not shown) when the forward portion is inserted into receptacle 26.

Before proceeding with the detailed explanation of the circuitry, a brief explanation of the symbolism used in FIGURE 9 is in order. Relays are designated by the letter K followed by an identification numeral. Thus, K184 indicates relay 184. A letter suffix to a relay designation, such as K184A, indicates the "A" groups of contacts of relay 184. The letter prefixes C, O and A, such as CK184, OK184, or AK184, designate, respectively, the normally closed, the normally open, and the armature contacts of the relay 184. The letters, R, C, S, M, B and V represent conventionally, resistors, capacitors, switches, motors, batteries and transistors.

FIGURE 9, as was pointed out above, illustrates the circuitry contained in the hollow handle 162 of meter reader 28. A pair of batteries B178 and B180, connected in series by a lead 181, comprise a power source for operating motor M136 and electrical-pulse-actuated register 30. The negative terminal of battery B178 is connected in parallel to relays K182 and K184 of a pulse suppression circuit and to the emitter of a NPN-type transistor V186 (here employed as an electronic switch) by leads 188, 190 and 192, respectively. Relay K182 is connected by a lead 193 to a capacitor C194 and a bleed resistor R195 which are connected in parallel between lead 193 and a lead 196. Lead 196 is connected to one of the female connectors 27b3 in the forward end portion 168 of the meter reader casing 161.

Relay coil K184 is connected by parallel leads 198 and 200 respectively to contact OK184B of relay K184 and to contacts OK182B of relay 182. Contacts CK184B and OK184A are not used and merely serve to provide an open position for movable contacts AK184B and AK184A respectively. Movable contacts AK184B and AK182B are connected to a lead 202 by leads 204 and 206 respectively. Lead 202 is connected to one of the female contacts 27b4. Contact AK182B is movable, upon energization of relay K182, from contact CK182B, which is connected by a lead 208 to a movable contact AK184A, to contact OK182B. Upon energization of relay K184 contact AK184A is movable to disengage contact CK184A and contact AK184B is movable from its open position shown to engage contact OK184B. Contact CK184A is connected by a lead 210 to a resistance 212 which is connected to the base of transistor V186 by lead 214. The collector of transistor V186 is connected by a lead 216 in tre register circuit to the counter actuating coil 230 of register 30. A lead 232 completes the circuit from coil 230 to lead 181 and, therefore, to the positive terminal of battery B178. Lead 234 of a circuit for operating motor M136 is connected between contact AK182A, which is movable between contacts OK182A and CK182A, and the female connector 27b1. Contact OK182A is unused except to establish the open position of AK182A. A lead 236 connects contact CK182A to the positive terminal of battery B180. The motor circuit is completed by a lead 238 extending from the junction of leads 181 and 232 to the female contact 27b2. When meter reader 28 is plugged into receptacle 26, pins 27a1, 27a2, 27a3 and 27a4 and female connectors 27b1, 27b2, 27b3 and 27b4 establish continuity between leads 137a in the meter and 234 in the meter reader, between leads 138 in the meter and 238 and 196 in the meter reader, and between leads 152 in the meter and 202 in the meter reader. It will be understood that the pin 27a3 and connector 27b3 is to merely provide a switch separate from the other pins 27a1, 27a2 and 27a4 and 27b1, 27b2 and 27b4 for the energization of the circuitry in the meter and the reader. This same result could also be accomplished in the reader in the manner described below in the description pertaining to FIGURE 9A.

The information extracting operation of the system shown in FIGURE 9 depends on whether or not reed switch S126 is open or closed when meter reader 28 is plugged into receptacle 26. If it were closed and the switch were connected directly to the register counter coil 230, it is apparent that a pulse would be immediately transmitted to the counter coil. This however, is undesirable since, when the meter was read the previous time and reed switch S126 moved to the closed position in which it then remained, a pulse was transmitted to the counter coil 230. In short, a single closing of reed switch S126 may, in this manner, produce two pulses. The accuracy of the remote meter reader 28 is dependent upon the total indicated on register 30 being advanced a predetermined amount by a single pulse each time reed switch S126 is closed. And, since each pulse may cause the total indicated by register 30 to advance in the order of 1000 gallons, accuracy is important and it is necessary to suppress the unwanted second pulse generated under the circumstances outlined above or the customer may otherwise be billed for a significant quantity of water which he has not consumed. In the present invention, suppression of the unwanted pulse is accomplished as follows: When the forwardly extending portion 168 of remote meter reader casing 161 is plugged into receptacle 26, pins 27a1–27a4 in receptacle 26 enter into and contact the female contacts 27b1–27b4 disposed in the forward portion 168 of meter reader 28 and, as pointed out above, establish continuity between leads 137a and 234, leads 138 and 238 and 196, and leads 152 and 202. This establishes a circuit from the positive terminal of battery B178 through leads 181, 238, 140 and 196, in parallel through resistance R195 and capacitor C194, lead 193, relay K182, and lead 188 to the negative terminal of battery B178. The flow of current through this circuit energizes relay K182 since capacitor C194, being uncharged, offers only a low resistance to the flow of current through the circuit. At the same time that relay K182 is energized, however, capacitor C194 begins to charge and will, therefore, subsequently offer a very high resistance to the flow of current through the above circuit to deenergize relay K182. Energization of relay K182 moves contact AK182A from engagement with contact CK182A into engagement with contact OK182A thereby preventing a circuit from being established to the motor M136 in flow meter 20. At the same time, relay K182 moves contact AK182B from engagement with contact CK182B into engagement with contact OK182B. With reed switch contacts 128 and 130 closed, this establishes a circuit from the positive terminal of battery B178 through leads 181, 238 and 138, reed switch contacts 128 and 130, leads 202 and 206, contacts AK182B and OK182B, lead 200, relay K184, and lead 190 to the negative terminal of battery B178. This circuit energizes relay K184, causing contact AK184A to move into engagement with open contact OK184A and causing contact AK184B to move into engagement with open contact OK184B. Closing of contacts AK184B and OK184B establishes a holding circuit for relay K184 from the positive terminal of battery B178 through leads 238, 138, reed switch contacts 128 and 130, leads 202 and 204, contacts AK184B and OK184B, lead 198, relay K184, and lead 190 to the negative terminal of battery B178 so long as contacts 128 and 130 remain closed. Movement of contact AK184A into engagement with open contact OK184A prevents a pulse from being transmitted to counter coil 230 through transistor V186 since transistor V186 is non-conductive when there is no bias on the base thereof.

When condenser C194 is fully charged, the resistance offered to the flow of current through relay K182 by it and by resistor R195 will be so high that relay K182 will be deenergized. This will cause contact AK182A to move into engagement with closed contact CK182A and will cause contact AK182B to move into engagement with closed contact CK182B. Relay K184 will remain energized through the holding circuit described above. Closing of contact AK182A with normally closed contact CK182A establishes a circuit through motor M136 as follows: from the positive terminal of battery B180 through lead 236, contacts CK182A and AK182A, lead 234, motor M136, and leads 138, 238 and 181 to the negative terminal of battery B180. Motor M136 will thereupon rotate magnetic disc 116 and as each pole of disc 116 is brought into proximity with switch S126 the contacts 128 and 130 will close and as each pole is moved away from the switch contacts 128 and 130 will open. As disc 116 rotates, switch contacts 128 and 130 will thereupon open and close making and breaking the circuit to relay K184. Deenergization of relay K184 causes contact AK184A to restore into engagement with normally closed contact CK184A and causes contact AK184B to restore into engagement with contact CK184B, thus interrupting the holding circuit. At this time the circuit is in the condition shown in FIGURE 9 and is in condition for counting.

Assuming now that the circuit is conditioned for counting, as motor M136 rotates disc 116 past switch S126, contacts 128 and 130 will alternately open and close once for each pole of disc 116. When these contacts are closed, a biasing potential is established on the base of transistor V186 through a circuit comprising the positive terminal of battery B178, leads 181, 238, 138 and 137b, contacts 128 and 130, leads 152, 202 and 206, contacts AK182B and CK182B, lead 208, contacts AK184A and CK184A, lead 210, resistance 212 and lead 214. The transistor V186 then becomes conductive and will allow a pulse of current to flow through a circuit established through the counter coil 230 as follows: from the positive terminal of battery B178 through leads 181 and 232, coil 230, lead 216, the collector of transistor V186, the emitter of transistor V186, lead 192 and the negative terminal of battery B178. The pulse energizes counter coil 230 and causes the register 30 to make a single advance of preselected magnitude. Register 30 may be of the conventional, plural order, pulse actuated, stepping counter type.

When the magnetized disc 116 has rotated sufficiently, contacts 128 and 130 open and the biasing current on the base of transistor V186 ceases to flow. Transistor V186 then becomes non-conductive and the circuit through counter coil 230 is interrupted. Thus, transistor V186 constitutes an electronic switch, allowing current to flow through counter coil 230 when switch contacts 128 and 130 are closed, and terminating the current flow when the contacts are open. Motor M136 is arranged to rotate disc 116 at such a speed that a pulse of sufficient duration to advance register 30 once will be transmitted to counter coil 230 each time contacts 128 and 130 close.

As the motor rotates magnetic disc 116, it also rotates the threaded shaft 110 fixed thereto, causing spur gear 108 to move along shaft 110 to its original position as determined by the engagement of pin 252 on spur gear 108 with stop pin 250 on shaft 110. The use of the circuit comprising leads 137b and micro switch 240 is optional. When not used the motor M136 is mechanically stalled when pin 252 engages pin 250 and the flow of pulses to the counter stops and the reading is completed. When the flow of pulses stops as evidenced by the counter being stopped the meter reader should be withdrawn from the receptacle because the motor will draw current from the battery as long as the motor is stalled and the remote reader is engaged in the receptacle. When it is desired to positively preclude any unnecessary discharge of the battery after the motor is stopped and before the reader is withdrawn the circuit comprising lead 137b and micro switch 240 is used. Under these circumstances where the original position is reached simultaneously as pin 252 contacts pin 250 spur gear 108 contacts a spring loaded microswitch 240 in lead 137b, moving contact 242 away from contacts 244 and 246 and interrupting the circuit to motor M136. Spring 248 will again bias contact 242 against contacts 244 and 246 when, subsequently, spur gear 108 is again moved axially on shaft 110 by the meter measuring device 40 and away from microswitch 240.

When motor M136 ceases to run, meter reader 28 may be removed from receptacle 26. Bleed resistor R195 then bleeds off the charge on capacitor C194 to prepare the meter reader circuit for a subsequent reading. It will be observed, at this point, that the circuit in meter reader 28 is in the condition shown in FIGURE 9, that motor M136 has ceased to run because spur gear 108 has been returned to its zero or original position at which point pin 250 acts as a positive stop or because microswitch 240 is open and the power source (battery B178) has therefore been disconnected. The cycle of operation described above is then repeated, the analog information storing device 46 again being operated by measuring device 40 through worm wheel 80 to store information relating to the flow of fluid passed through meter 20.

Should contacts 128 and 130 be open when meter reader 28 is plugged into receptacle 26, the circuit shown in FIGURE 9 will be conditioned for counting in the following manner: relay K182 will be energized in the manner described above. However, relay K184 will not be energized since the open switch contacts 128 and 130 interrupt the continuity between leads 137b and 152. When condenser C194 is charged, relay K182 will be deenergized, completing the circuit through motor M136 in the manner described above, and returning contacts AK182A and AK182B to the positions shown in FIGURE 9, thereby conditioning the circuit for counting which will take place in the manner just described.

It will often happen that, when the meter is read, a pulse will not be generated and transmitted to the register 30 of hand tool 28 at precisely the same time that spur gear 108 reaches its original or zero position. This is because one pulse is generated for each billing unit and the actual volume of fluid passed through the meter between two readings may not be exactly a whole number of units. As a result, if the consumer has used 7½ billing units of water, for example, register 30 will indicate but 7 units.

Unlike the prior art resettable remote registers, however, this fractional unit is not lost when the meter is read and reset, but is carried over to the next period. For example, assume that magnetic disc 116 is arranged to generate two pulses per revolution. If the consumer uses 7½ units of water during a billing period then, disc 116 will make 3¾ revolutions when the meter is read, generating 7 pulses, and register 30 will read 7. However, when the meter is next read, disc 116 will generate a pulse after having made but ¼ of a revolution, automatically compensating for the fraction of a billing unit not previously registered. Over several billing periods, therefore, the meter will very accurately reflect the actual volume of water passed through the meter.

It is to be understood that the novel analog type information storing device and the novel mechanism provided for converting the information started in analog form to digital form at a location remote from the analog device is by no means limited to water consumption meters. On the contrary, this arrangement is useful in any application where it is desired to store information in analog form and extract it, subsequently, at a remote location, and convert it to digital form.

Figure 11:
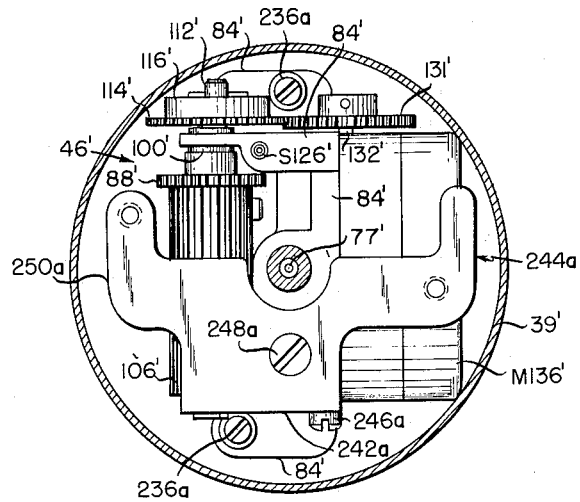
FIGURE 11 is a horizontal section of the meter illustrated in FIGURE 10 taken substantially along line 11—11 showing the modified analog-type information storage device employed in the alternate embodiment of the meter.
Figure 12:
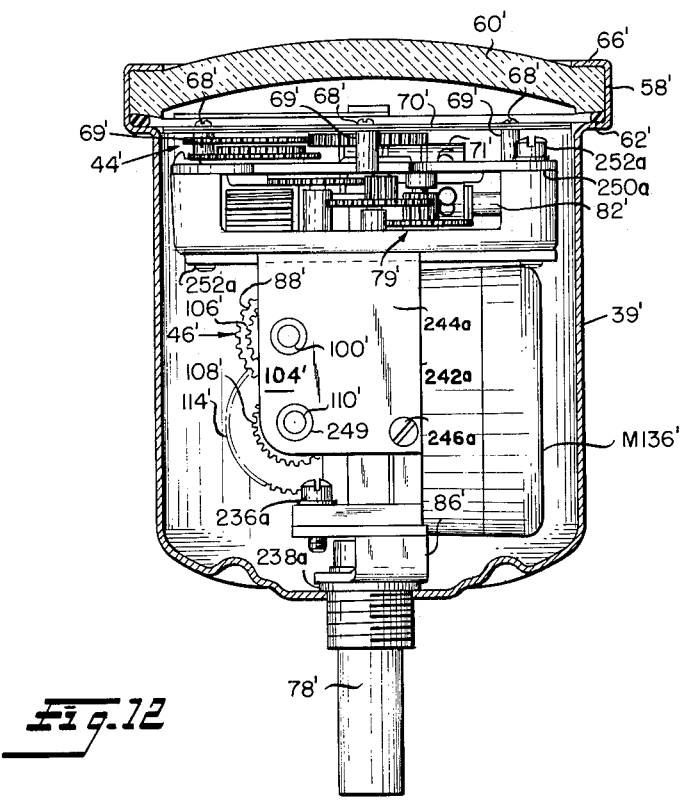
FIGURE 12 is an elevational view, partly in section, of the meter illustrated in FIGURE 10, looking at it from the direction indicated by line 12—12 of that figure.

The meter 234a illustrated in FIGURES 10–12 is similar to meter 20 and primed reference characters will therefore be employed for like parts. Meter 234a, like meter 20, is of the same general construction as the meter described in detail in United States Patent No. 2,857,763 issued to R. Z. Hague et al., October 28, 1958, for "Fluid Meters." It consists of a meter body 32' divided by an integral wall portion 34' into a lower chamber 36' and an upper chamber 38'. Lower chamber 36' houses an oscillating piston type, fluid flow measuring device 40' and upper chamber 38' houses a sub-assembly comprising a hermetically sealed casing 39' within which are mounted cumulative type register 44' and a resettable, analog type, information storage device 46'. The register 44' is operated by the flow measuring device 40' and registers the cumulative volume of the fluid passed through meter 234a. Simultaneously, measuring device 40' furnishes information relating to the volume of fluid passed through meter 234a to the storage device 46' which stores this information in analog form.

The bottom access opening 48' of casing 32' is closed by a frangible frost plate 50' having a corrosion resistant liner 52' and maintained in fluid tight relationship to meter casing 32' by an annular bead 54' integral with liner 52' and a plurality of suitably spaced bolts 56'.

The permanently and hermetically sealed casing 39' is fabricated from non-corrodible material and has, at its upper end, a radially enlarged portion 58' which receives a transparent window 60'. Window 60' is held in sealed relation against enlarged casing portion 58' by a gasket 62'. The top peripheral edge 66' of casing 39' is spun over the top of window 60' to form a permanent seal which dirt and moisture cannot penetrate and which cannot be disassembled without destruction of the casing. Thus, unauthorized persons are prevented from tampering with the register 44' or the information-storing device 46'.

Secured to the top of register 44' by screws 68' and spacers 69' is a dial plate 70' through which a portion of the plural order counter mechanism 71' (see FIGURE 12) of register 44' is visible. This arrangement enables the meter reader to view the counter mechanism through the transparent window 60'.

Water enters meter 234a through an inlet port 72' in meter body 32', flow through a cylindrical screen 74' into lower chamber 36', enters measuring device 40' through an inlet port in the top wall 75' thereof (not shown) and is exhausted therefrom through a radial outlet port (not shown) to an outlet port 76' in meter casing 32'. Flow measuring device 40' is constructed in accordance with the principles set forth in the patent to R. Z. Hague et al., referred to above. Oscillation of the piston 76a' in flow measuring device 40', through the intermediary of magnetic drive coupling 76b', causes rotation of a spindle 77' (see FIGURE 4) mounted in a coaxial tubular member 78' in the manner described in detail in said Hague et al. patent. Tubular member 78', which is closed at its lower end by an integral wall 78a', is secured in sealing relationship to casing 39' by an annular weld 78b' or by brazing.

Spindle 77' is connected through gear reduction drive 79' (which is shown in FIGURES 10 and 12 and which may be of the type illustrated in the forementioned patent to R. Z. Hague et al.) to a worm 80' mounted on the input shaft 82' of the plural order, intermediate pinion type, carry-over mechanism equipped counter 71' or register mechanism 44'. Register mechanism 44' is also of conventional construction and is preferably of the type described in the patent to R. Z. Hague et al., referred to above. Worm 80' drives the input gear of analog information storage device 46', which constitutes an important part of this invention (and which is shown in FIGURES 10–12). Storage device 46' is mounted in a chassis casting 84' attached by screws 236a to a bracket 86' which is supported on and fastened to a radially extending flange portion 238a of tubular member 78' adjacent the bottom wall of casing 39'. The input gear of information storage device 46' is a helical gear or worm wheel 88' rotatively fixed to an input shaft 100' which is journalled, at one end, in an appropriate bearing (not shown) mounted in vertical side wall portion 102' of chassis 84'. The other end of shaft 100' is journalled in a bearing 241 mounted in the vertical leg 242a of a gear train bracket 244a which is attached to vertical side wall 104' of chassis 84' by a screw 246a and to the top wall of the chassis by a screw 248a. The horizontally extending leg 250a of bracket 244a supports register 46' which is fastened to it by screws 252a.

As is best shown in FIGURES 10 and 11, input gear 88' is located within chassis 84' adjacent the iner side of wall portion 102'. Input gear 88' is engaged and driven by the worm 80' (which, it will be remembered, is driven by measuring device 40' through spindle 77' and gear reduction drive 79' and is also the input to register counter mechansims 71').

Rotatively fixed to and mounted on input shaft 100' between chassis wall portions 102' and vertical gear train bracket leg 242a immediately adjacent gear 88' is a cylindrical spur gear 106'. Spur gear 106' engages, and drives, a spur gear 108' which has a threaded axial bore (not shown). Spur gear 108' is mounted on and travels along a threaded shaft 110'. Threaded shaft 110' is rotatably journalled in bearings 249 and is mounted in axially fixed position between vertical chassis wall portions 102' and vertical gear train bracket leg 242a with one end 112' extending outwardly beyond wall 102'.

Fixed to the outer end 112' of shaft 110' for rotation therewith is a unitary assembly consisting of a spur gear 114' and a flat-surfaced magnetized disc 116' rotatively fixed thereto and provided with a plurality of alternating north and south poles. Mounted adjacent magnetic disc 116' in chassis side wall 102' is a reed switch S126' (see FIGURE 11). Reed switch S126' is identical to the reed switch S126 described above in conjunction with the embodiments of FIGURES 2–4.

Spur gear 114' is continuously engaged by a spur gear 131' and is driven by gear 131' only at the selected intervals when it is desired to extract the information stored in storage device 46'. Spur gear 131' is rotatively fixed to a shaft 132' extending through a vertical wall 104' of chassis 84'. Shaft 132' is the output of a conventional gear train (not shown) driven by motor M136'. Motor M136' is rigidly mounted in support casting 84' in any convenient manner.

Motor M136' of meter 234a is connected to switch S126' and to meter terminal block 260 in a manner similar to that in which motor M136' is connected to switch S126 and as shown diagrammatically in FIGURE 9A. In this embodiment of the leads 152', 138' and 137a' interconnecting motor M136' and switch S126' are connected to terminals 260a, 260b and 260c as shown in FIGURE 9A. Terminal block 260 is sealed to casing 39' by brazing or other suitable means. Thus, the entire contents of the housing 39' are hermetically sealed within said housing. One end of a three wire cord similar to cord 26 and containing leads 152", 138" and 137" is connected to the terminal block 260, the leads 152", 138" and 137" being connected respectively to terminals 260a, 260b and 260c. The other end of leads 152", 138" and 137" are connected respectively to pins 262, 264 and 266 of a receptacle similar to remote receptacle 26. The reader in this embodiment has three female connections 262a, 264a and 266a which are adapted to receive respectively pins 262, 264 and 266 of the receptacle. In the embodiment of FIGURE 9A leads 202, 196 and 234 are connected respectively to female connectors 262a, 264a and 266a. Lead 238 is adapted to be connected to connector 264a when the pin 264 is received therein. Thus, when pin 264 is inserted into connector 264a lead 138" is connected to both leads 238 and 196. The remainder of the reader circuitry is identical to that shown in FIGURE 9.

The operation of the fluid flow meter 234a is as follows: water entering the meter through inlet port 72' flows through screen 74' into the measuring device 40', causing oscillation of piston 76a. The water then passes through an outlet port (not illustrated) in measuring device 40' back into the meter casing and is discharged through outlet port 76'. Oscillation of piston 76a' causes rotation of spindle 77' which, acting through gear reduction drive 79', drives worm 80'. Worm 80', it will be remembered, is connected to the input shaft 82' of cumulative register counter 71'. Thus, register counter 71' will be operated to indicate a cumulative total of volume of liquid passed through fluid flow meter 234a. Worm 80', at the same time, drives the input gear 88' of the analog information storage device 46'. Gear 88' drives shaft 100', to which it is fixed, rotating cylindrical gear 106'. As gear 106' rotates, it drives spur gear 108' which, therefore, moves axially along threaded shaft 110'. The threads on shaft 110' are terminated at a point (not shown) such that, if spur gear 108' is moved past its maximum capacity position, the gear will rotate on shaft 110' without moving axially along it. This prevents gear 108' from being jammed against input gear 88' and damaging the meter. An overrun spring 253, extending between the bearing 249 mounted in chassis side wall 102' and the hub of spur gear 108' biases the latter gear away from input gear 88' and into engagement with the threads on shaft 110' so that spur gear 108' will properly engage the latter when it is subsequently reset. The distance which spur gear 108' moves along threaded shaft 110' is directly proportional to the volume of fluid passed through flow meter 234.

When the end of a billing period is reached, the hand-carried tool 28 may be plugged into a remote receptacle consisting of pins 262, 264, and 266 to activate motor M136' to rotate threaded shaft 110', moving spur gear 108' back to its zero position, thereby rotating disc 116' and generating a series of pulses which are transmitted to register 30 to cause it to indicate the volume of fluid passed through meter 20 during the billing period. When spur gear 108' reaches its original position a stop 254 mounted on it (see FIGURE 10) engages a pin 256 attached to threaded shaft 110' to prevent further rotation of the gear.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fluid flow meter having flow measuring means, means operatively connected to and movable from an initial position along a fixed path by said flow measuring means, selectively operable means for returning said movable means along said path to said initial position, and transducer means associated with said selectively operable means for converting the distance said movable means travels along said return path to a physical indication of the volume of fluid passed through said meter.

2. A hand carried meter reader for use with a fluid flow meter having means for storing information relating to the volume of fluid passed through said meter and means for extracting said information and transmitting it to a location remote from said meter as a series of electrical pulses comprising: means adapted to be selectively engaged with said transmitting means for activating the information extracting means, and transducer means for receiving information stored by said meter and converting it to a physical indication of the volume of fluid passed through the meter, said transducer means including an electrically actuated register, a source of electrical energy, a capacitor operatively connected to said source of electrical energy, and means including a switching device activated by the transmission of a pulse to said reader from the flow meter for discharging said capacitor through and thereby advancing said register.

3. The meter reader of claim 2, wherein said meter reader includes a self-contained power source operatively associated with said activating means and said transducer means.

4. Fluid flow measuring apparatus, comprising:
 (a) means for registering the cumulative flow of fluid passed through said apparatus;
 (b) means proximate to and operatively associated with said cumulative flow registering means for storing information relating to said fluid flow;
 (c) means activated by said information storage means for generating a series of electrical pulses as said information storage means is reset;
 (d) means disposed at a location remote from said cumulative registering means for;
  (1) extracting and registering said stored information in the form of electrical pulses generated by said generating means at selectively variable intervals; and
  (2) incident to said information extraction and registration placing said storage means in an informationless condition without disturbing the reading of said cumulative registering means, whereby, each time information is extracted from said storage device, said remote register registers directly the volume of fluid passed through said apparatus since the next preceding extraction without disturbing the cumulative total displayed by the cumulative registering means.

5. A fluid flow meter comprising:
(a) positive displacement flow measuring means including an output member rotatable through an arc proportional to the volume of liquid passed through the meter and first gear means operatively connected to said output member for rotation therewith, and
(b) an analog device operatively connected to said flow measuring means for storing information relating to the volume of fluid passed through said meter including second gear means intermeshed with said first gear means, a threaded member fixedly positioned with respect to said second gear means, and threaded gear means mounted on, rotatable about, and movable along said threaded member from an initial position by said second gear means, whereby liquid flowing through said meter will displace said threaded gear means a distance proportional to the volume of liquid passed through said meter to thereby record said volume in analog form.

6. The meter of claim 5, including selectively operable means for extracting and registering the information in said storage device.

7. A fluid flow meter, comprising:
(a) positive displacement flow measuring means including a rotatable member and first gear means attached to said member for rotation therewith;
(b) an analog device operatively connected to said positive displacement flow measuring means for storing information relating to the volume of fluid passed through said meter including second gear means intermeshed with said first gear means, a threaded member fixedly positioned with respect to said second gear means, and threaded gear means on, rotatable about, and movable from an initial position by said second gear means; and
(c) means for extracting and registering the information in said storage device including selectively operable means for rotating said shaft and thereby driving said threaded gear means along said shaft in the direction opposite to which it was driven by said second gear means, and means discontinuing rotation of said shaft when said threaded gear means reaches the initial position.

8. The meter of claim 7, wherein said information extracting and registering means further includes transducer means for converting the rotation of said shaft into a series of electrical pulses and a pulse-actuated register for counting said pulses and giving a physical indication of said count.

9. The meter of claim 8, wherein said transducer comprises a magnetized member rotatable by said shaft and provided with a plurality of alternating north and south poles, switch means adapted to be alternately opened and closed by said poles, a source of electrical current, and circuit means including said switch means, said source of current, and said register.

10. The meter of claim 9, wherein said circuit means includes means for suppressing the first pulse transmitted to said register upon each occasion that said shaft is rotated to extract the information from said storage device when said switch means is in the closed position upon initial connection of said register.

11. The meter of claim 8, wherein said register is positioned remote from said storage device and said meter includes means for transmitting said pulses to said register.

12. The meter of claim 11, including a hand-carried tool having said register mounted therein and comprising means for selectively connecting said register in operative relationship to said pulse-transmitting means.

13. A fluid flow meter for measuring units of fluid flow comprising a resettable storage device for storing a cumulative indication of the flow passed through said meter between occasions of storage device reset, selectively operable, remotely disposed means for simultaneously extracting and registering the number of whole units of fluid flow accumulated since the last storage device reset and resetting said storage device; and memory means associated with said storage device for storing any fractional unit in excess of the number of whole units on said storage device and adding said fractional unit to the cumulative flow indication the next time said cumulative flow indication is extracted.

14. In combination, counting means, means for storing the count in analog form, means for converting the number of whole counting units of said stored count to a series of electrical pulses incident to reset of the count storing means, means for retrieving and registering said electrical impulses at selected intervals, memory means for storing in analog retrievable form any fraction of a counting unit over the whole number of counting units on said analog storing means, and means arranged to prevent said retrieving means from registering the same pulse upon successive activations thereof.

15. In combination, means for generating a series of pulses and means for selectively activating said generating means and counting the pulses generated thereby, said pulse generating means being so arranged that when it is activated it may be in a first condition where it will generate a pulse without further conditioning or in a second condition where it will not generate a pulse without further conditioning, said counting means including means arranged to suppress the first pulse generated by said generating means if said generating means is in said first condition when it is activated and to count the first pulse generated by said generating means if said generating means is in said second condition when it is activated.

16. The meter as defined in claim 1, including a permanently sealed casing surrounding all of the named meter components other than the flow measuring means, and means mounted within and extending from said casing to operatively connect the flow measuring means to said movable means.

17. The subassembly of claim 16 wherein the casing is so constructed that physical access to its interior can be achieved only by destroying it.

18. The meter as defined in claim 16, including means accessible from the exterior of said casing for activating said selectively operable means.

19. The meter of claim 18 wherein said access means is adapted to transmit an electrical current.

20. In combination, means for making a series of measurements of a physical parameter and converting said measurements to digital form, means operably connected to said measuring means for cumulating said measurements and converting and storing them in analog form, means for retrieving said cumulation at selectively variable intervals, means for converting a part of said cumulation to a series of electrical pulses, each representing a unit of predetermined magnitude of said parameter, means for totaling and registering said electrical pulses, and memory means incorporated in said retrieving means for storing the remainder of said cumulation in analog form and adding it to the next cumulation extracted from said storage means, the magnitude of said remainder being less than the magnitude of one of said units.

21. A fluid flow meter comprising, in combination, cyclical means for measuring the volumes of fluid flowing through said meter in successive periods of selectively variable duration; means for converting said volumes to cumulative numerical totals equaling the number of cycles completed by said measuring means in each of said periods; means for receiving and storing said total in analog form; means for retrieving said total from said storage means at the end of each of said periods; means for converting part of said retrieved total to digital form as a series of electrical pulses, each of said pulses representing a predetermined volume of fluid; means for totaling said pulses and registering said total; memory means for storing the remainder of said total in analog form and adding it to the numerical total next extracted from said analog storage means, said remainder representing a volume less than said predetermined volume.

22. In combination with a measuring device and an analog accumulator continuously connected to be actuated thereby to totalize the measurements of said measuring device, means connected to the output of said accumulator for resetting said accumulator, means connected to the output of said accumulator for producing a digital output signal for each discrete increment of a predetermined value of said accumulator incident to accumulator reset indicative of the total number of discrete increments of predetermined magnitude accumulated subsequent to the last discrete increment converted to digital form during the immediately preceding reset-readout operation of said accumulator, and means for retaining any fractional portions of one of said discrete increments for readout during the next reset-readout without operation.

23. A fluid flow meter comprising:
 (a) flow measuring means including a rotatable member and first gear means, attached to said member for rotation therewith;
 (b) means operatively connected to and including a means physically displaceable linearly from an initial position along a fixed linear path by said flow measuring means comprising a second gear means meshed with said first gear means, a threaded member fixedly positioned with respect to said first gear means, and a threaded gear means on said fixed member and rotatable thereabout in response to the rotation of said second gear means;
 (c) means for returning said physically displaceable means along said path to said initial position; and
 (d) transducer means operable incident to the return of said physically displaceable means along said linear path to provide a physical indication of a volume of fluid passed through said meter.

24. The fluid flow meter of claim 1, wherein said transducer means includes means for giving said indication at a position remote from said flow measuring means.

25. The fluid flow meter defined in claim 5 including means for retrieving and registering said stored information at selected intervals and converting it to a series of electrical pulses incident to reset of the storing means to prevent said retrieving means from registering the same pulse upon successive activations thereof.

26. In combination, a fluid flow meter having flow measuring means, means including means actuated by said flow measuring means for generating a series of pulses each indicative of the passage through said meter of a predetermined volume of fluid, and means for selectively activating said generating means and counting the pulses generated thereby, said pulse generating means being so arranged that when it is activated it may be in a first condition where it will generate a pulse without further conditioning or in a second condition where it will not generate a pulse without further conditioning, said counting means including means arranged to suppress the first pulse generated by said generating means if said generating means is in said first condition when it is activated and to count the first pulse generated by said generating means if said generating means is in said second condition when it is activated.

27. In combination: (a) a flow meter having a fluid flow measuring device; (b) a resettable analog data storage device comprising a threaded shaft having a correspondingly threaded member mounted thereon for rotational movement about and linear displacement along said shaft; (c) means operatively connecting said threaded member to said flow measuring device for linear displacement along said threaded shaft in response to movement of said flow measuring device; and (d) means for retrieving stored data including means connected to said threaded shaft for rotating said shaft in a direction capable of returning said threaded member to its initial condition.

28. The combination defined in claim 27, wherein said data retrieval means includes analog to digital data converting means.

29. In combination, a fluid flow meter having means for measuring the passage of predetermined unit volumes of fluid through the meter and converting said measurements to digital form, means operably connected to said measuring means for cumulating said measurements and converting and storing them in analog form, means for retrieving said cumulation at selectively variable intervals, means for converting the total number of whole unit volumes of said cumulation to a series of electrical pulses, each representing the passage through the meter of the predetermined unit volume of fluid, means for totaling and registering said electrical pulses, and memory means incorporated in said retrieving means for storing the remainder of said cumulation in analog form and adding it to the next cumulation extracted from said storage means, said remainder representing the passage through the meter of a volume of fluid which is less than said predetermined unit volume.

30. In combination, a fluid flow meter having a means for generating a rotational movement, portions of said movements being indicative of the passage of a predetermined volume of fluid through the meter, an analog accumulator continuously connected to said means and activated thereby to totalize said rotational movement, readout means including an analog-to-digital converter connected to the output of said accumulator for resetting said accumulator and producing a digital output signal incident to accumulator reset indicative of the total number of movement portions accumulated subsequent to the last portion converted to digital form during the immediately preceding reset-readout operation of said accumulator.

References Cited by the Examiner

UNITED STATES PATENTS

| | | | |
|---|---|---|---|
| 2,094,711 | 10/1937 | Leininger | 73—272 |
| 2,602,660 | 7/1952 | Shannon | 340—187 |
| 2,607,221 | 8/1952 | Babson et al. | 340—203 |
| 2,623,936 | 12/1952 | Kennedy et al. | 340—203 |
| 2,630,714 | 3/1953 | Zimmerman | 73—272 |
| 2,671,211 | 3/1954 | Black et al. | 73—272 |
| 2,855,585 | 10/1958 | Quinby | 340—204 |
| 2,857,763 | 10/1958 | Hague et al. | 73—257 |
| 2,943,487 | 7/1960 | Potter | 73—231 |
| 2,973,899 | 3/1961 | Hegner. | |
| 2,978,688 | 4/1961 | Rumble | 340—203 |
| 3,006,712 | 10/1961 | Eichacker | 340—188 |
| 3,027,551 | 3/1962 | Laurin | 340—177 |
| 3,046,534 | 7/1962 | Constant | 340—188 |
| 3,050,718 | 8/1962 | Giel | 340—203 |

RICHARD C. QUEISSER, *Primary Examiner.*

ROBERT L. EVANS, DAVID SCHONBERG,
*Examiners.*